United States Patent

Mati

[11] Patent Number: 6,161,625
[45] Date of Patent: Dec. 19, 2000

[54] EQUIPMENT FOR DIGGING GROUND WITHOUT DESTRUCTIVE EXCAVATION WORK

[76] Inventor: Miro Cesare Mati, Via Bonellina 140, 51100 Pistoia, Italy

[21] Appl. No.: 09/381,156
[22] PCT Filed: Mar. 12, 1998
[86] PCT No.: PCT/IT98/00050
 § 371 Date: Nov. 22, 1999
 § 102(e) Date: Nov. 22, 1999
[87] PCT Pub. No.: WO98/41697
 PCT Pub. Date: Sep. 24, 1998

[30] Foreign Application Priority Data

Mar. 17, 1997 [IT] Italy .................................. FI97A0052

[51] Int. Cl.⁷ ...................................................... E02F 3/06
[52] U.S. Cl. ............................ 172/96; 172/111; 172/123; 172/532; 175/19
[58] Field of Search ................................. 172/532, 40, 96, 172/111, 123; 175/56, 394, 19; 299/55, 15, 14

[56] References Cited

U.S. PATENT DOCUMENTS

| | | | |
|---|---|---|---|
| 283,283 | 8/1883 | Romine et al. | 175/394 |
| 962,994 | 6/1910 | Waters | 175/394 |
| 1,371,137 | 3/1921 | Albers | 175/394 |
| 1,403,711 | 1/1922 | Schaefer et al. | 175/394 |
| 1,955,768 | 4/1934 | Powell | 175/394 |
| 2,248,733 | 7/1941 | Anderson | 175/394 |
| 2,341,237 | 2/1944 | Phipps | 175/394 |
| 2,365,941 | 12/1944 | Crake | 175/394 |
| 3,467,210 | 9/1969 | Lautsch et al. | 175/394 R |
| 3,499,293 | 3/1970 | Kato . | |
| 3,961,584 | 6/1976 | Paton et al. . | |
| 3,961,671 | 6/1976 | Adams et al. | 175/19 R |
| 4,073,353 | 2/1978 | Bodine | 175/56 |
| 4,364,441 | 12/1982 | Geeting | 175/394 R |
| 4,458,765 | 7/1984 | Feklin et al. | 175/19 |
| 4,572,303 | 2/1986 | Marechal | 299/55 R |
| 4,623,025 | 11/1986 | Verstraeten | 175/394 R |
| 4,641,732 | 2/1987 | Andry | 188/379 |
| 4,653,245 | 3/1987 | Webb | 52/749 |
| 4,848,844 | 7/1989 | Weiss | 299/55 |
| 4,858,701 | 8/1989 | Weyer | 299/55 R |
| 4,913,246 | 4/1990 | Mukai | 175/394 R |
| 5,048,552 | 9/1991 | Bourne | 137/39 |
| 5,236,050 | 8/1993 | Dairon | 172/103 |
| 5,390,892 | 2/1995 | Platus | 248/619 |
| 5,564,353 | 10/1996 | Wade et al. | 175/394 R |
| 5,641,027 | 6/1997 | Foster | 175/394 R |

FOREIGN PATENT DOCUMENTS

| | | |
|---|---|---|
| 2 439 273 | 5/1980 | France . |
| 2 442 925 | 6/1980 | France . |
| 2 253 641 | 9/1992 | United Kingdom . |

*Primary Examiner*—Christopher J. Novosad
*Attorney, Agent, or Firm*—McGlew and Tuttle, P.C.

[57] ABSTRACT

Equipment for digging ground in urban areas includes a hinged support and maneuvering arm (3), an omnidirectional damping device (36), a vibration or oscillation generator (38), a motor (40) and a tool (28) which is made to rotate by the motor and provide with a helical structure with a tip (28B) designed to penetrate in screw fashion into the ground and act thereon it by the vibrations received, so as to dislodge it and break it up.

19 Claims, 2 Drawing Sheets

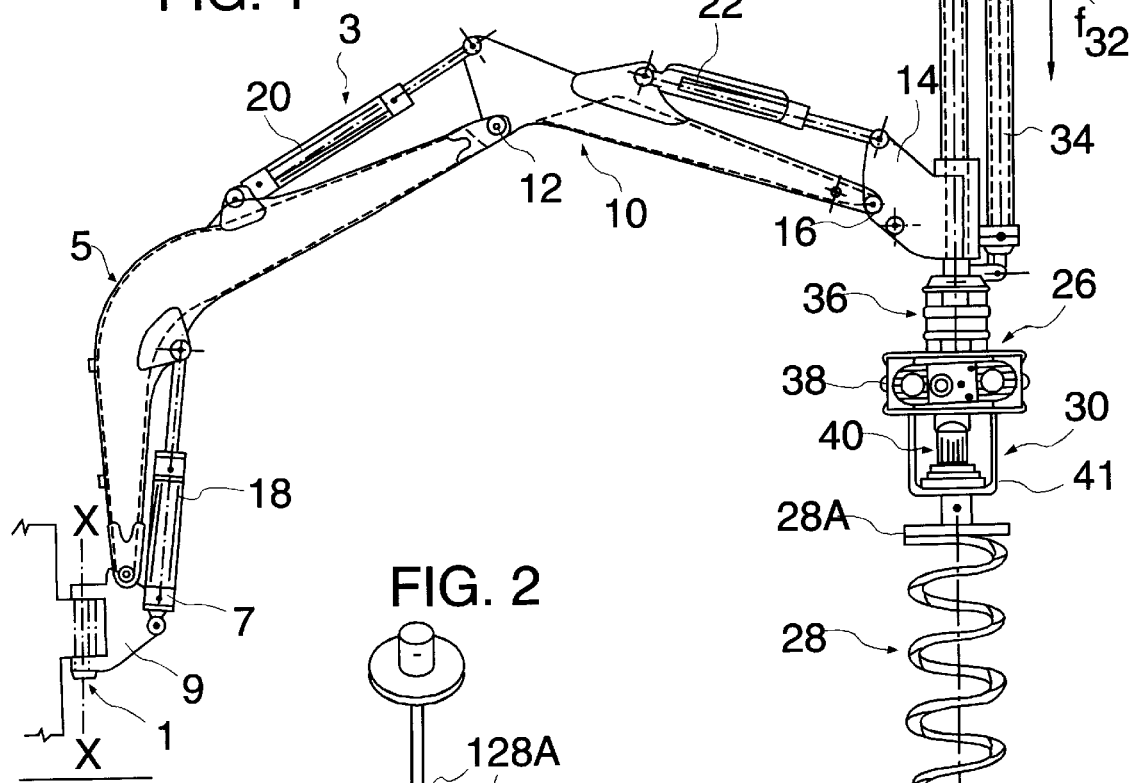
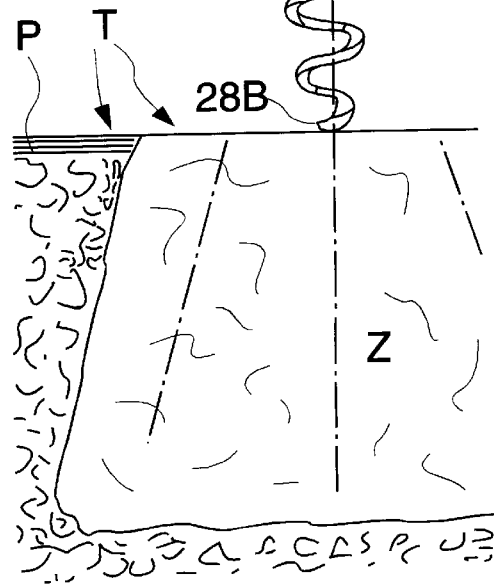
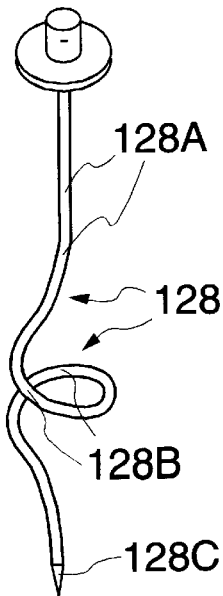
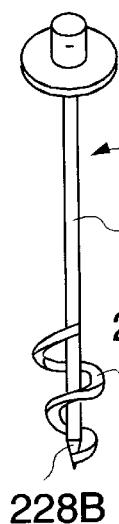

ics in cities where it is impossible or extremely costly to use excavators, which destroy and damage the paving and pipes, sewerage systems, underground cables and any other objects which are very commonly found underneath the ground in cities.

These and other objects and advantages will emerge from the text which follows.

SUMMARY OF THE INVENTION

The equipment in question comprises a hinged support and maneuvering arm for an operating assembly which is equipped with a vibration or oscillation generator, a motor, and a tool which is made to rotate by the said motor means and provided with a helical structure designed to penetrate in screw fashion into the ground and act thereon by means of the vibrations received, so as to dislodge it and break it up.

The vibration generator is advantageously—but not necessarily—a vibrator which is of the axial type or has a predominant axial component.

The operating assembly advantageously comprises a damping device, in particular of the omnidirectional type, designed to reduce the transmission of the vibrations from the vibration or oscillation generator to the support arm, and allow limited inclination of the geometrical axis of the tool, also so as to vary the direction of movement thereof.

The tool may extend in the manner of a helical stem, or may have an axial stem terminating in a helix, or else may have an axial stem with a ferruled tip and a helical element which extends rearwards from the ferrule.

In another configuration, the tool has an axial stem with curved sickle-shaped bars which are slightly inclined downwards (in the operating position), ie. towards the end of the stem and, underneath said bars, additional bars which are similar, but shorter and less curved than the preceding ones The hinged support arm may comprise—in addition to several segments hinged together—an angular articulated joint and an axial displacement system for the tool.

The motor may be designed to rotate also in opposite directions so as to obtain both penetration into the ground and extraction from the ground.

BRIEF DESCRIPTION OF THE DRAWINGS

The invention will be better understood from a reading of the description with reference to the accompanying drawing which shows a non-limiting example of embodiment thereof. In particular, in the drawing:

FIG. 1 shows an overall schematic view of the equipment according to the invention;

FIGS. 2 and 3 show a perspective view of two possible variants of the "auger" tool illustrated in FIG. 1, which can be applied as an alternative to the latter;

DESCRIPTION OF THE PREFERRED EMBODIMENT(S)

Figure 4:
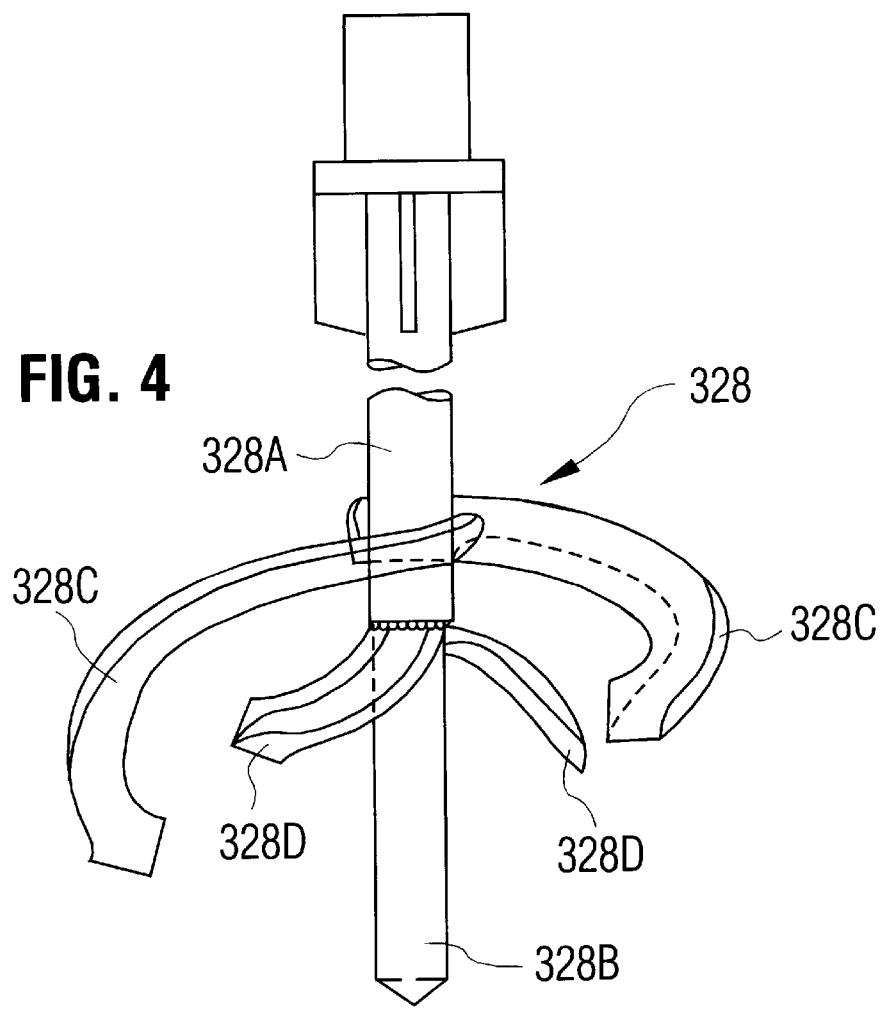
FIGS. 4 and 5 are a side view and axial view of another variation of embodiment.

According to that illustrated in the accompanying drawing, 1 denotes a self-propelled machine which is equipped with an articulated multiple arm, generally denoted by 3, of a type known per se. In particular, this arm may be hinged with the machine 1 about a vertical axis X—X, may have a first arm section 5 hinged at 7 with the bracket 9 hinged along the axis X—X, a second arm section 10 hinged at 12 with the arm section 5 and a bracket 14 hinged at 16 with the arm section 10. Actuators 18, 20, 22 operate between the bracket 9 and the section 5, between the sections 5 and 10 and between the section 10 and the bracket 14. The bracket 14 carries an operating assembly 26, of which a tool 28 forms part. In particular, the assembly 26 comprises a group 30 which is capable of performing axial displacements and which has a substantially predominant vertical component along an axial guide 32 and hence in a direction indicated by the arrow f32; the axial displacements of the guide 32 may be actuated by means of a cylinder/piston actuator 34, which displaces the assembly 26 and hence the tool-carrying group 30. A damping device 36 of the omnidirectional type forms part of the tool-carrying group 30; downstream of this damping device 36 there is an oscillation generator or vibrator 38 which advantageously may be a vibrator of the axial type so as to act substantially in the direction of the arrow f32, except in the case of variations in the angular position allowed by the damping device 36. The axial vibrator is followed by a motor means 40 which may be advantageously a hydraulic motor with a relatively high power and low rpm; this motor 40 is designed to cause the relatively slow rotation of the tool 28 which must rotate and must penetrate into the ground T in a restricted zone where the paving P for example of a city road or the like may be broken up or has already been broken up.

Extraction of the tool may be performed by means of an axial return movement upwards or also—and advantageously—with a rotation in the opposite direction to that of penetration, and therefore by "unscrewing" the tool from the dug ground.

Digging of the ground may be confined to a zone which is indicated by Z and which may have a surface area for example of the order of 1 m$^2$ and a depth also of the order of 1 m. Digging is performed in said zone so as to dislodge the earth and break it up and therefore allow oxygenation thereof, as well as create conditions suitable, for example, for positioning of a plant, the roots of which must subsequently be able to spread underneath the paving P. Working with an inclined-axis tool, it is also possible to dig those parts of the ground which underground extend further than the surface zone Z.

The tool as shown in FIG. 1 may be a bar which can bend to a limited degree in a resilient manner, having an axial extension and helical progression, between a connecting section 28A and a tip 28B which is defined by the last end turns of increasingly smaller dimensions.

The tool to be mounted on the tool-carrying group 30 may also be of a different type and still actuated by the same motor 40; it may have, for example, one of the forms shown in FIGS. 2 to 5.

According to FIG. 2, the tool 128 has a stem 128A extending axially in the form of a rod which is prolonged by substantially helical volutes 128B terminating in a tip 128C, the zone 128B, 128C forming the continuation of the stem 128A.

FIG. 3 shows a tool 228 modified slightly with respect to that 128 shown in FIG. 2; this tool 228 has a stem 228A which extends as far as the tip 228B, from which there departs a helical element 228C which extends rearwards from the tip 228B, in the manner of a helical spiral, and which may have a diameter more or less gradually increasing from the tip 228B.

Figure 5:
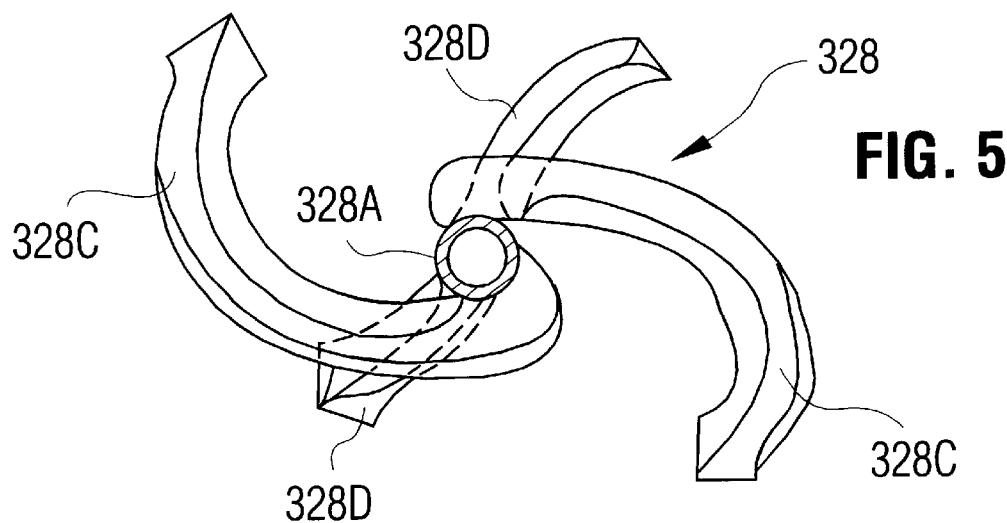

FIGS. 4 and 5 show a further variation of embodiment of the tool. In this solution the tool 328 has a stem 328A, from which stem, at a distance from the tip 328B, at least two robust bars 328C extend, each having a curved sickle-shaped extension, similar to a helical arc gradually moving away from the stem 328A and inclined downwards (in the operating condition), ie. towards the tip 328B and terminating in an approximately foil-shaped cusp; in the design with two bars 328C, the latter are approximately diametrically opposite-and slightly staggered axially. As shown in FIGS. 4 and 5, the diameter of the bars 328C, 328D formed as they extend from the stem 328A is several times larger than the diameter of the stem 328A, Immediately underneath the two bars 328C additional bars 328D, similar to the preceding bars, but shorter and less curved, are provided.

Whatever the form of the tool, be it that of 28, 128, 228, 328 or another type, its function is to be "screwed" into the ground of the zone Z to be dug, also repeatedly and in different plan-view positions which may also be angularly modified as is indicated by the multiple dot-dash lines shown in the zone Z; the tool, each time it is made to penetrate through rotation by the motor 40 and through lowering by actuator 34, is also vibrated in such a way that, during penetration, it transmits a vibration and hence causes shaking of the ground which affects both the parts in which the tool is screwed and the neighbouring parts, which are broken up owing to the vibrations. It should be noted that, owing to the possibility of inclination due to the presence of the omnidirectional damping device, the resilient flexibility of the tool during penetration into the ground, the flexibility of the damping device, and the breaking-up and hence crumbling of the ground resulting from the vibrations in the zone where the tool is working, the tool itself is also able to deviate to a limited extent when encountering any relatively hard and solid obstacle, such as for example a metal pipe, the wall of a masonrywork duct or the like, and also a more or less armored cable, such as those of the underground type.

A device 41 for limiting the torque during transmission of the rotation to the tool, so to stop the movement thereof when encountering obstacles, may also be provided.

It follows that digging may be performed without particular risk of harming what may be protected from damage such as the underground pipes or the like in the zone to be dug. In any case, digging is performed without destroying the paving around the zone Z, but affecting only that limited zone, as indicated by Z, which may be amplified underground as a result of working with the tool inclined repeatedly in various directions. A digging action obtained in this manner is useful for being able to arrange in position a plant or the like and also other for other working operations or other needs which may arise underneath the paving P. These operations hitherto have been carried out either manually or with the aid of excavators which, in addition to greatly damaging and destroying the existing road surfaces and creating a permanent obstacle in the zone where these operations are performed, also cause—in some cases irreparable—damage to those objects which instead ought to be protected from damage such as underground pipes, cables, ducts, etc.

The components described may also be provided with suitable sensors which are capable of detecting the presence of a resistance or of an anomalous obstacle in relation to the consistency of the ground, both generating simple alarm signals and, if necessary, also stopping operation (for example by means of the aforementioned torque limiter) or even causing the return movement of the parts with raising of the operating assembly 26, stoppage or reverse rotation of the tool or the like, as well as raising of the hinged arm 3.

The operations are performed with the machine 1 at a standstill and with the movements of the arm 3 or with small displacements of the machine itself on the paving P around the zone Z to be acted on by the tool.

It is understood that the drawing shows only an example provided by way of a practical demonstration of the invention, it being possible to vary the forms, dimensions and arrangements of said invention without thereby departing from the scope of the idea underlying the invention itself. The presence of any reference numbers in the enclosed claims has the purpose of facilitating reading of the claims with reference to the description and the drawing, and does not limit the protective scope represented by the claims. For example, the equipment may be provided with two tools operating simultaneously, more or less alongside each other.

I claim:

1. An apparatus for mixing air into a patch of ground, the apparatus comprising:
    a hinged support and maneuvering arm;
    a damping device connected to said maneuvering arm;
    a vibration generator connected to said damping device;
    a motor connected to said vibration generator;
    a tool connected to said motor and driven by said motor, said tool having a shape to penetrate into the patch of the ground in a screw type manner and dislodge dirt of the ground to mix air with the dirt while substantially maintaining the dirt in said patch of ground.

2. The apparatus according to claim 1, wherein the tool has an axial stem with an end connected to said motor and a tip, said tool includes curved sickleshaped first bars which are inclined downwards in an operating position of the apparatus and towards said tip of the stem, said tool also includes sickle-shaped second bars between said first bars and said tip, said second bars being shorter and less curved than said first bars.

3. The apparatus according to claim 2, wherein said damping device is omnidirectional to allow inclinations of a geometrical axis of the tool.

4. The apparatus according to claim 2, wherein the motor is reversible so as to cause extraction of the tool from the ground.

5. The apparatus according to claim 1, wherein said damping device is omnidirectional to allow inclinations of a geometrical axis of the tool.

6. The apparatus according to claim 5, wherein the motor is reversible so as to cause extraction of the tool from the ground.

7. The apparatus according to claim 1, wherein the motor is reversible so as to cause extraction of the tool from the ground.

8. The apparatus according to claim 1, wherein the tool is operated via a torque limiter which interrupts movement of said tool in an event of an obstacle or resistance greater than a predetermined limit value.

9. The apparatus according to claim 1, wherein the hinged support and maneuvering arm comprises several segments which are hinged together, at least one angular articulated joint and an axial displacement system for axially displacing the tool on said arm.

10. The apparatus in accordance with claim 1, wherein:
    said tool includes a plurality of circumferentially curved bars.

11. The apparatus in accordance with claim 10, wherein:

said plurality of bars include a first set of bars and second set of bars axially spaced from said first set of bars.

12. The apparatus in accordance with claim 11, wherein:

said first set of bars extends radially further than said second set of bars.

13. The apparatus in accordance with claim 10, wherein:

said tool includes a stem with said plurality of bars radially extending from said stem, a diameter formed by said bars extending from said stem is several times larger than a diameter of said stem.

14. The apparatus in accordance with claim 1, wherein:

said tool includes a plurality of helically curved bars.

15. The apparatus in accordance with claim 1, wherein:

said maneuvering arm holds said tool vertically and inclined to vertical.

16. The apparatus in accordance with claim 1, wherein:

said maneuvering arm and said vibration generator are connected on diametrically opposite sides of said damping device.

17. The apparatus in accordance with claim 16, wherein:

said motor and said damping device are connected on diametrically opposite sides of said vibration generator;

said tool and said vibration generator are connected on diametrically opposite sides of said motor;

said tool includes a plurality of helically curved bars, said plurality of bars include a first set of bars and second set of bars axially spaced from said first set of bars, said first set of bars extends radially further than said second set of bars, said tool includes a stem with said plurality of bars radially extending from said stem, a diameter formed by said bars extending from said stem is several times larger than a diameter of said stem;

said maneuvering arm holds said tool vertically and inclined to vertical.

18. The apparatus in accordance with claim 1, wherein:

said motor and said damping device are connected on diametrically opposite sides of said vibration generator.

19. The apparatus in accordance with claim 1, wherein:

said tool and said vibration generator are connected on diametrically opposite sides of said motor.

* * * * *